United States Patent

[11] 3,608,472

[72] Inventors Arthur F. Pelster;
 William L. Parker; Donald D. Modglin, all of Nashville, Tenn.
[21] Appl. No. 830,844
[22] Filed June 5, 1969
[45] Patented Sept. 28, 1971
[73] Assignee Kentucky Fried Chicken Corporation
 Louisville, Ky.

[54] PRESSURIZED COOKING SYSTEM
 15 Claims, 7 Drawing Figs.
[52] U.S. Cl. .................................................. 99/327,
 99/330, 99/407, 99/408, 99/417, 200/81.9, 210/167
[51] Int. Cl. .................................................. A47j 27/62
[50] Field of Search ........................................ 99/326,
 327, 330, 403, 407, 417, 336, 408; 210/167, DIG. 8

[56] References Cited
 UNITED STATES PATENTS

| | | | |
|---|---|---|---|
| 3,210,193 | 10/1965 | Martin | 99/336 UX |
| 3,282,197 | 11/1966 | Smith | 99/407 X |
| 3,410,199 | 11/1968 | Quednau | 99/403 |
| 3,466,997 | 9/1969 | Hartzog | 99/330 |
| 3,431,835 | 3/1969 | Angold | 99/408 |

*Primary Examiner*—Billy J. Wilhite
*Attorney*—Watson, Leavenworth and Kelton

ABSTRACT: A pressurized cooking system for frying food, such as chicken parts, in a bath of hot liquid, such as fat. This system includes in a closed recirculating circuit a closable and sealable cooking pot chamber for removable reception of food pieces to be fried in the bath therein, a pump and heat exchanger means, with suitable piping connecting these units in series and isolating the interiors thereof and the circuit from the surrounding atmosphere during the cooking cycle. The recirculating liquified fat is pooled at elevated pressure in the cooking chamber to a limited elevation that permits the food for cooking to be immersed in the pooled bath while providing a liquid free head space thereabove. A valved steam vent is connected directly to this head space for venting steam to a point of lower pressure outside the system when the internal pressure in the cooking chamber increases beyond a predetermined maximum. A withdrawal section of the piping is connected to the cooking chamber below the surface of the bath pooled therein, and it has direct connection through one intake of a selector valve to the pump intake. This withdrawal section of the piping is also connected through a drain valve into a preferably heated filtering and storage tank. The selector valve also has another intake which is connected in an alternate position through a passage into the bottom of the filtering and storage tank. This tank serves initially, before a series of succeeding cooking cycles, as a source of liquified fat for the recirculating circuit to be delivered through filters in this tank nd the selector valve to the pump intake and also, after a cooking cycle is completed, as a receiver and storage of hot liquified fat that is drained from the cooking chamber. When the heat exchanger is of the electrically energized type its heat source heaters preferably are mounted in the hot liquified fat pumped therethrough. This heat exchanger is associated with a flow switch unit with the electrical circuit switch embodied therein being connected into the electrical circuit which energizes the heaters, so that if the flow is below a predetermined minimum or ceases this switch opens to shut off the energizing current to the heaters. The drain valve serves as a liquid blowdown valve.

PRESSURIZED COOKING SYSTEM

BACKGROUND OF THE INVENTION

The pressurized cooking system of the present invention relates to such cookers designed for cooking food, such as chicken parts, in hot liquid, such as fat or shortening. It is designed to cook pieces of food cyclically, for example to fry chicken parts, in the chamber of a closable and sealable cooking pot in a manner constituting an improvement upon the process taught in the U.S. Pat. to Sanders No. 3,245,800 of Apr. 12, 1966; and the apparatus disclosed in the U.S. Pat. to Keathley et al. No. 3,431,834 of Mar. 11, 1969. It has been proposed in the U.S. Pat. to Angold No. 3,431,835 of Mar. 11, 1969 to provide for such a purpose a hot liquified fat recirculating system which includes in series a hot fat, open-top supply tank, a motorized pump having its intake communicated with the supply tank. The discharge of the pump is connected through a valve mechanism to the bottom of a closed and openable cooking chamber which is to be filled with the hot liquified fat pumped thereinto by the pump. This valve mechanism also has a passage leading back to the supply tank chamber for bypass back flow of some of the pumped hot liquified fat. A liquid withdrawal conduit is connected to the top of the cooking chamber and is provided with a pressure control valve. Beyond the pressure control valve this withdrawal conduit feeds into an exhaust chamber which is open to the atmosphere for asserted venting of vapors from the withdrawn hot liquified fat. Therebeyond the exhaust chamber is communicated through a filter back into the open supply chamber. Another passage from the valve mechanism communicates to the exhaust chamber for ultimate drainage of the hot liquified fat in the cooking chamber into the open supply chamber through the filters that are in the recirculating system and which, during a cooking cycle, are traversed by the cooking liquid. Thus, the hot liquified fat which is recirculated through the cooking chamber to and through the heated supply chamber is continuously in contact with the oxygen in the atmosphere and entrained steam, both at the exhaust chamber and at the open top supply chamber, and this condition is maintained whether the hot liquified fat is circulating through the cooking chamber during a cooking cycle or is drained therefrom back into the supply chamber. The fat or shortening which is conventionally used in pressurized hot fat-frying systems, such as that of Angold, is readily subject to oxidation and hydrolysis deterioration during prolonged contact with air and entrained steam. Due to the resulting break down of the fat frequent change of the cooking fat is required and the attendant economical loss entailed by the undesirably frequent discard of such deteriorated fat is large.

SUMMARY OF THE INVENTION

The pressurized cooking system of the present invention avoids to an unusual degree development of such break down of the hot liquified fat or shortening and attendant economic loss, as well as other undesirable features of such prior art proposal. The present system, when employed, for example, to fry chicken parts, maintains the hot liquidified fat during each cooking cycle in a closed recirculating circuit which is isolated from the surrounding atmosphere. It also assures close control of the pressure and temperature of the hot liquified fat in the cooking chamber and permits automatic operation of the system during each cooking cycle. This system also separates the steam which is developed in the cooking chamber from the moisture in the chicken parts, to be separately exhausted or vented directly therefrom apart from the hot liquid fat which is recirculated through this chamber during the cooking cycle. This assures minimization of the hydrolysis and breakdown of the circulating fat or shortening.

The term "TIMER" mechanisms used herein and the diagrammatic box so labeled therewith are indicative of suitable timing mechanism and electrical circuitry associated therewith which are programmed to provide a desired cycle of the entire cooking system operation of the present invention. It is within the skill of one versed in the art of designing and using timing mechanisms and associated electrical control circuits to devise many differing types thereof for satisfying the requirements dictated by a given set of conditions and the particular results desired. Thus the disclosure of the present application is not burdened by the details of a specific embodiment thereof which has been designed to accomplish a certain sequence of operations of the parts and subassemblies of the system for, by way of example, frying chicken parts, that is set forth later with respect to a particular embodiment designed for this purpose.

Such embodiment preferably includes in series in a closed, hot liquified fat recirculating circuit and in isolation from the surrounding atmosphere the following units. One unit is a closable and sealable cooking pot defining an isolated chamber for removable reception of the food to be fried in a bath of hot fat therein. Another unit is a pump capable of sustained operation during a cooking cycle. A third unit is a through-flow, liquified fat cleansing device. A fourth unit is a through-flow, enclosed heat exchanger for maintaining the circulating liquified fat at an elevated temperature. Conduit means successively connect these units together to form the recirculating circuit, and the withdrawal portion thereof is communicated with the cooking pot chamber at a point below the intended elevation of the surface of hot liquified fat that is pooled therein while flowing therethrough during a cooking cycle. This hot fat surface in the closed cooking chamber constitutes an interface between liquid and gaseous medium, or steam and vapors, in a superposed, substantially liquid-free head space maintained during the cooking cycle.

Vented conduit means is connected directly to the closed chamber head space and it leads to a lower pressure venting point, for example to the surrounding atmosphere. A normally closed operating valve is mounted in this venting conduit means and it is adapted to open at a predetermined maximum pressure automatically to vent steam from the head space during the cooking cycle when the pressure in the head space exceeds such maximum. A blowdown venting means also is connected directly to the closed cooking communicates head space and it includes a valve adapted to be opened after the completion of a cooking cycle for venting inlet opening steam pressure in the head space to a point of lower pressure, for example the surrounding atmosphere. Desirably, this blowdown valve is an electrically operated off-on valve.

The closed cooking chamber head space also preferably has connected thereto a lid pressure electrical switch and a drain pressure electrical switch, for advantageous purposes indicated hereinafter in a recital of the operation of a typical embodiment illustrated, by way of example, in the drawings.

This exemplary embodiment desirably includes inlet opening bypass in the recirculating conduit means, preferably connected to the latter at a point just beyond the hot liquid fat withdrawal connection to the closed cooking pot chamber and at another point preceding the pump intake. This bypass includes a filter tank, which may have an open top, with the inlet leading thereto from the cooking pot liquid withdrawal line including an electrically operated off-on drain valve, and this inlet preferably precedes filtering means in this tank. A suction conduit communicates the bottom of the interior chamber of this filter tank, preferably beyond filtering means therein, to the pump intake through one inlet opening of an electrically operated two-way selector valve which has its outlet opening connected to the pump intake, and with its other inlet opening connected directly to the cooking pot chamber withdrawal line. This filter tank is intended to serve as a temporary storage of liquid fat for initial supply to the closed recirculating circuit and the cooking pot chamber therein prior to recycling operation of the system. It also serves as a liquid fat blowdown receptacle for reception and temporary storage of the fat in the cooking pot chamber between successive operating cycles. This filtering and drain tank is provided with a suitable heat source primarily designed to prevent solidification of the fat or shortening stored therein in periods intervening cooking cycles, which preferably is an electrical heater in the bottom thereof. This tank desirably may be provided with a removable cover to protect the operator from sloshed hot fat and to minimize oxidation destruction of the latter. It also desirably may be easily removed from connection to the recycling system for cleansing this tank and the fat.

Preferably, the heat exchanger is in a form providing a plurality or bank of heating sources successively mounted in the recirculating conduit means which immediately precedes the inlet to the cooking pot chamber. These heating sources may be in the form of electrically energized heaters over which the circulating liquified fat successively flows as it is recirculated through the closed system circuit. These immersed heaters preferably are arranged in a plurality of subgroups so that those in one subgroup may be energized for supply of heat simultaneously while those in another subgroup are deenergized, for easy adjustment of the amount of heat being supplied to the recirculating hot liquid fat at any particular time during a cooking cycle.

Since it is desirable to use immersed heaters it is necessary that provision be made for preventing the heating thereof, when flow of the hot liquified fat through the heater houses is reduced to a degree, or ceases, that will cause buildup thereon of charred fat or other residue. The heat generated by the heaters will char films of fat thereon if the immersion thereof in flowing liquid is not maintained or the rate of flow is not sufficient to carry away enough of the heat generated as to avoid such charring and residue production. This is avoided by mounting in the conduit line leading to or from the heat exchanger assembly a flow switch which embodies a normally open electrical circuit switch that requires closure for energizing any or all of the heaters. Flow of the liquified fat through this flow switch unit above a predetermined minimum rate causes closure of the circuit switch thereof in the heater energizing circuitry so that the heaters may be energized selectively as demanded by conditions in each cooking cycle. Stopping of the circulating pump between such cycles automatically causes opening of this flow switch.

The structural details of this unique flow switch unit and its operational functioning are set forth later.

It is also desirable to provide a premelt reservoir or tank to melt and then hold the liquid cooking fat for addition thereof to the recirculating circuit when needed. In order to serve this purpose a suitable heater, which preferably is of the electrical hot plate type, is provided under the bottom of this premelt tank. If desired for purposes of protecting the operator from hot fat and to minimize oxidative destruction of the hot fat stored therein, this premelt tank may be provided with a removable cover. A delivery passage or pipe extends from the bottom of the chamber of this premelt tank to the recirculating system. It is desirable that the present embodiment provide this connection in the section of the recirculating conduit means which bypasses the filtering and drain tank i.e., at a point intervening the two-way selector valve and the point where the inlet to the filtering and drain tank through the drain valve is connected to the cooking pot liquid withdrawal line. Flow from the premelt tank to this section of the recirculating conduit means preferably is effected by elevating the former above the latter to cause gravity flow of the hot liquid fat down through the delivery passage or pipe. This delivery passage or pipe is equipped with a valve which has a manual control so that the operator may open it to add liquid fat makeup therefrom into the recirculating system at a time when this system is not under elevated pressure. In order to prevent back up of hot liquid fat from the recirculating circuit into this premelt tank when this system is pressurized, if the manually operated valve accidentally be opened at this time, this supply passage or pipe has associated with this manually operated valve suitable check valve means.

The sequence of operations and functions of these units and the system including them is set forth in the following description of an exemplary embodiment of the invention.

BRIEF DESCRIPTION OF THE DRAWINGS

Other objects of the invention will in part be obvious and will in part appear from reference to the following detailed description taken in connection with the accompanying drawings, wherein like numerals identify similar parts throughout, and in which.

DESCRIPTION OF A PREFERRED EMBODIMENT

Figure 1:
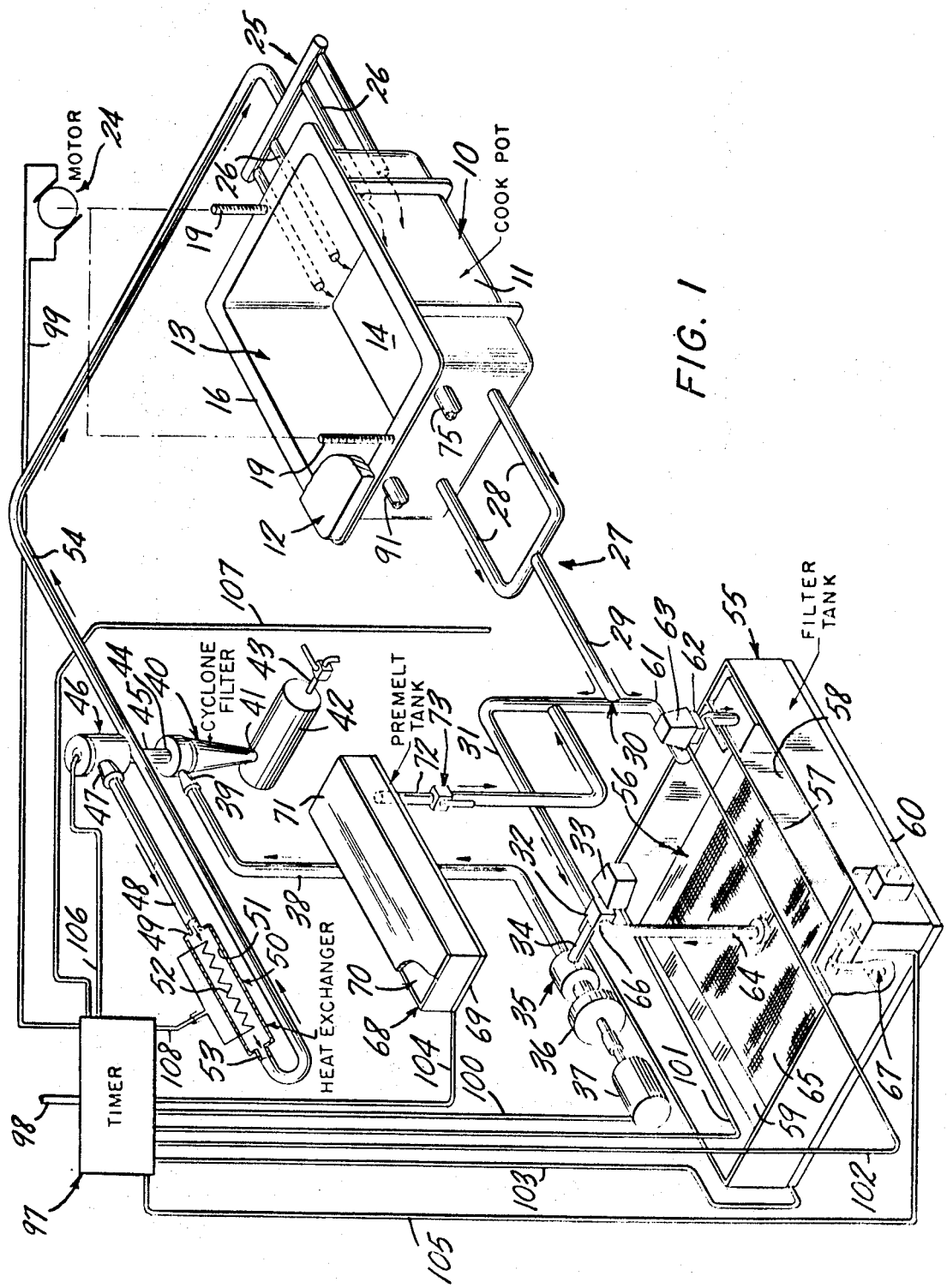
FIG. 1 is a perspective schematic layout, with some parts broken away and in section, of the liquid or hot liquified fat-recirculating circuit and liquid supply of an embodiment of the pressurized cooking system of the present invention which has been specifically designed for frying food, such as chicken parts, in hot liquified fat or shortening.
Figure 2:
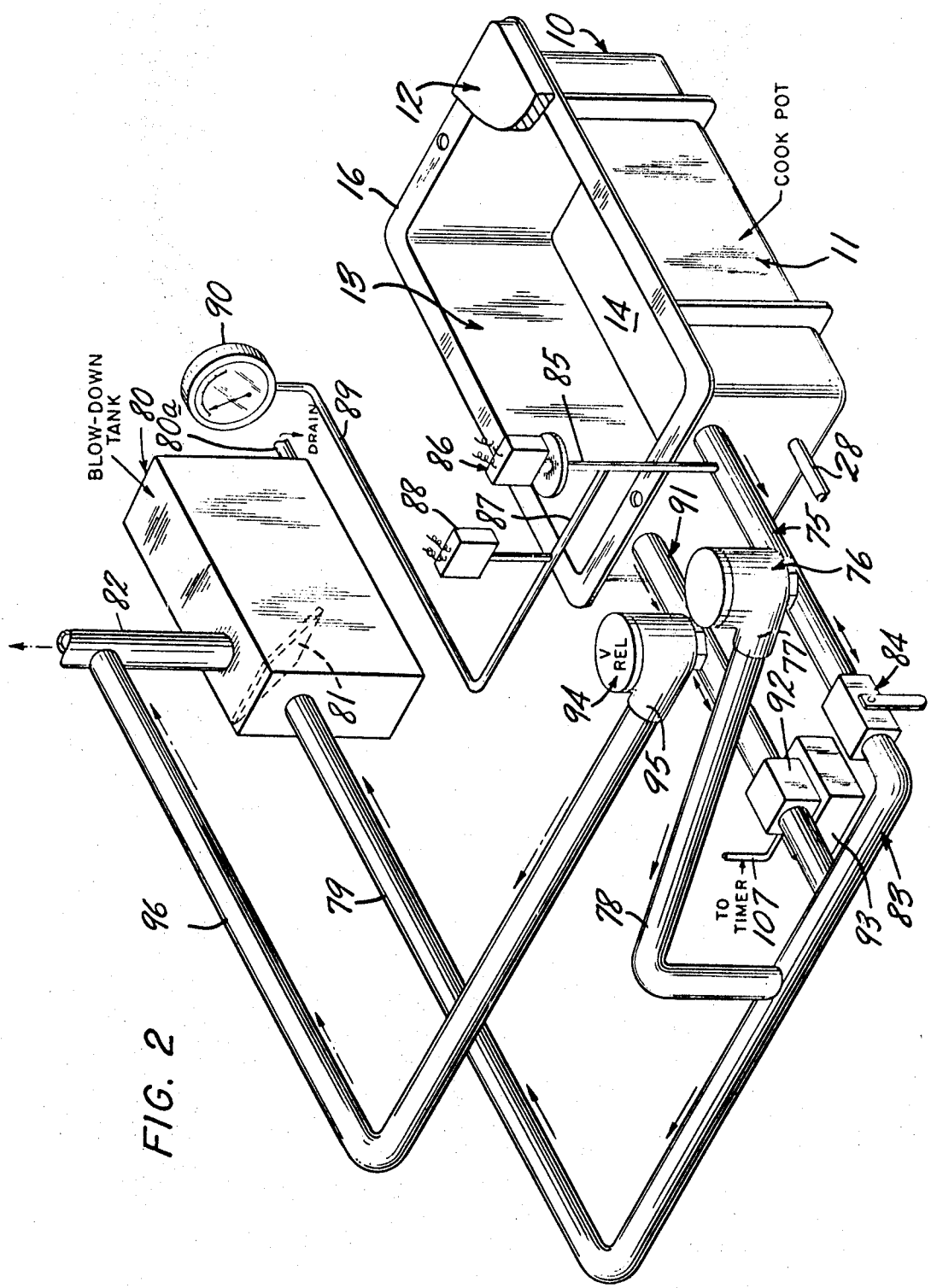
FIG. 2 is a similar diagrammatic perspective view, with some parts broken away and indicated in section, of the steam venting means associated with the cooking pot of the liquid recirculating circuit of FIG. 1.
Figure 3:
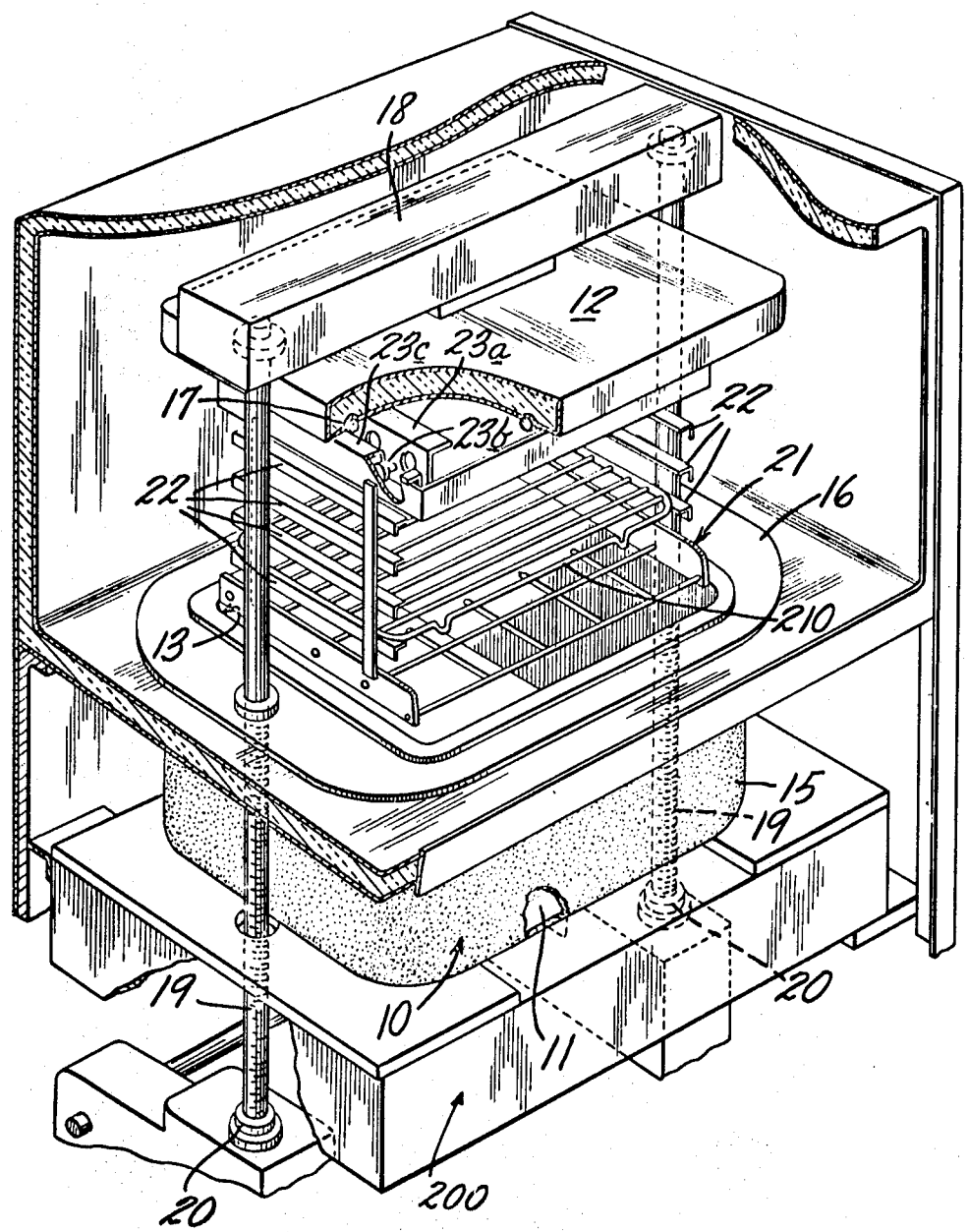
FIG. 3 is a perspective view, with parts broken away and in section, of the physical structure of that portion of the system in which is embodied the cooking pot, its movable lid, the chicken part-supporting racks suspended from the latter for lowering the chicken parts into a hot-liquified bath pooled in the cooking pot chamber, and mechanism to move the lid with the removable racks for loading and unloading the fried chicken parts supported thereon.

Referring to FIGS. 1, 2 and 3 it will be seen that the pressurized cooking system which has been particularly designed for frying chicken parts in hot liquified fat or shortening includes a cooking pot 10 which embodies a tank 11 and a removable cover 12, which together define an isolated cooking chamber 13. The cooking pot 11 which preferably is made from stainless steel, is provided with a transverse bottom 14 and, as is indicated in FIG. 3, may be desirably covered with a layer 15 of heat insulation. This cooking pot is provided with an annular lateral rim 16 about its open top end against which the bottom face of the cover or lid 12 is to be sealed by a circumscribing sealing ring 17 (indicated in FIG. 3). For removal of the cover 12 from the pot rim 16, in order to load chicken parts into the cooking chamber 13 and remove them therefrom after frying, this lid is preferably supported by a crossbar 18 (see FIG. 3) fixed thereto. The ends of the crossbar 18 are suitably supported on the top ends of a pair of jackscrews 19 which are threadably supported within internally threaded and rotatable sleeves 20 carried by a base housing 200. Thus when the internally threaded sleeves 20 are suitably rotated in one direction they cause advance therethrough of the externally threaded jackscrews 19 for lowering the crossbar 18 and the cover plate 12 therewith. Simultaneous rotation of the sleeves 20 in the opposite direction will raise the cover 12 to the open position indicated in FIG. 3. To the underside of the cover 12 is removably supported a suitable chicken parts-supporting rack 21 which is provide with a plurality of opposed pairs of end brackets 22, with each pair thereof adapted removably to support the ends of one of a plurality of wire racks 210. The internally threaded sleeves 20 are associated with suitable driving mechanism to rotate them together alternately in opposite directions, such as by means of an electric motor, indicated at 24 in FIG. 1. If desired, these sleeves 20 may be held fixed and the motor 24 and associated drive mechanism may rotate the jackscrews 19 to attain the same lid lowering and lifting action.

It is preferred that the bottom side of the lid 12 have fixed thereto a pair of transversely spaced, depending flanges 23a, each of which pivotally supports a group of free-running rollers 23b. Opposite sides of the top of the removable rack 21 have opposed channels 23c fixed thereto, so that the loaded rack may be removably attached to the lid by sliding these channels over the two groups of rollers 23b. By providing a second such rack 21 the operator is permitted to load one while the second and its load is immersed in the hot cooking bath during a cooking cycle.

In loading the cooking pot chamber 13 each wire rack 210 has distributed thereon the suitably coated chicken parts, and if only one rack is used on the opposed pair of bottom brackets 22 the depth of the pooled bath of hot liquified fat in the cooking pot chamber 13 will be minimized so that the rack of chicken parts will be just immersed below the surface of such pooled bath. With the employment of more racks of chicken parts the elevation of the pooled bath will be progressively increased by the operator to attain this desired pooling. However, it is intended that at all times a substantially liquid-free head space will be maintained above the surface of the pooled bath in the cooking pot chamber 13 immediately beneath the closing cover 12 for collection of gaseous medium therein, e.g., steam.

The means for supplying hot liquified fat to the cooking pot chamber 13 may be in the form of a manifold 25 (see FIG. 1) having a plurality of delivery tubes 26 extending therefrom and communicated through the chamber wall to the chamber. For the purpose of withdrawing hot liquified fat from the cooking pot chamber 13 a conduit withdrawal section 27 is provided, which may include a pair of tubes 28 communicated to the cooking pot chamber 13 in the vicinity of the bottom 14 of the latter, with these tubes commonly connected to a drain conduit or pipe 29. The pipe 29 is connected at the point 30 to a section of conduit pipe 31 which in turn is connected to one intake port of an electrically operated two-way selector valve 32. The selector valve 32 may be conventional solenoid or motorized two-way valve which is rotated back and forth between two positions by a suitable motor, the housing of which is indicated at 33 in FIG. 1. The common outlet port of the two-way valve 32 is connected by a section 34 of conduit to the intake of a pump 35 driven through gear box 36, preferably by an electric motor 37. The discharge of the pump 35 is connected by a conduit section 38 to the intake 39 of a conventional cyclone filter or separator 40.

The cyclone filter 40 has its lower end 41, through which rejects, such as large pieces of cracklings which may be entrained in the stream of flowing liquified fat, are to be discharged, connected to a collector tank 42 equipped with a valved drawoff 43. The discharge 44 for the accepts of the cyclone filter or separator is connected by a conduit section 45 preferably to the inlet port of a through-flow switch unit 46 that houses an electrical switch for closure of an electrical energizing circuit when flow of hot liquified fat therethrough is above a predetermined minimum rate with this switch being normally open when such flow ceases or falls below such minimum rate. The discharge 47 of the flow switch 46 is connected by a conduit section 48 to the inlet 49 of a heat exchanger 50.

The heat exchanger 50 has a through flow passage 51 through which the hot liquified fat is to be forced under elevated pressure, and in this passage are preferably located a plurality of electrically energizable heaters, diagrammatically indicated collectively at 52. As will be explained more fully later the switch in the flow switch unit 46 is in the energizing circuit of the electrical heaters so that minimum flow or cessation thereof through the flow switch unit will prevent these heaters from being energized. This will prevent undue scorching of the hot liquified fat which may be flowing through the recirculating circuit at a rate below the predetermined minimum. Films of the fat on the heaters when the latter are energized can be charred to form insulative residue coatings thereon, and thus the flow switch unit 46 assures that these heaters are maintained immersed in a stream of hot liquified fat which is caused, under normal conditions, to flow by the pump 35 at a relatively high rate. The discharge 53 of the heat exchanger 50 is connected by a conduit section 54 to the inlet manifold 25 for delivery of hot liquified fat into the cooking pot chamber 13, The flow switch unit 46 may follow the heat exchanger 50 for the indicated purpose, if desired.

It will thus be seen that the cooking pot chamber 13 (when closed by the cover or lid 12) the pump 35, the cyclone filter or separator 40, the flow switch unit 46 and the heat exchanger 50 are connected in series in a closed recirculating circuit which maintains the hot liquified fat therein isolated from contact by or communicate with the surrounding atmosphere or air, as is desirable in accordance with the present invention during the cooking cycle.

This system requires a source of liquified fat for charging such recirculating circuit, and also to serve as receptive means for the fat which is drained from the cooking pot chamber 13 at the end of a cooking cycle as well as to store such drained fat for supply back into the recirculating circuit for the next cooking cycle. For this purpose, a heated filtering tank 55 is provided which defines a reservoir chamber 56, suitably subdivided by a baffle plate 57 to provide an inlet compartment 58. The baffle plate 57 prevents hot liquified shortening or fat from splashing when it is delivered into the filter tank 55 through the drain valve (indicated hereinafter) after the completion of a cooking cycle. This filtering tank chamber 56 has a bottom wall 59 against which is mounted a heating plate 60 that may be electrically energized. A conduit section 61 is connected between the junction point 30 and the interior of the inlet compartment 58 through an off-on drain valve 62, which may also be electrically operated and thus may be either in the form of a solenoid or a motorized valve with the cover of the driving motor indicated in FIG. 1 at 63.

A withdrawal suction pipe 64 carries on its bottom end, adjacent the bottom wall 59 by the filtering tank chamber 56 suitable changeable filtering means 65. The top end of the suction pipe 64 is connected at 66 to the other inlet port of the selector valve 32. Thus the filtering tank 55, its valved inlet passage 61 and its withdrawal suction pipe 64 are bypassed by the section 31 of the recirculating conduit circuit. When the selector valve 32 is manipulated to communicate the suction pipe 64 of the filtering tank 55 to the pump inlet communication through the withdrawal conduit section 27 with the cooking pot chamber 13 is shut off. Thus, at the end of a cooking cycle, when the drain valve 62 is opened the hot liquified fat in the cooking pot chamber 13 will be drained into the filtering tank chamber 56, and it is there stored in liquified condition until after the fried chicken parts are removed from the cooking pot chamber 13 and then the pump 35 is again started for returning this stored liquified fat to the recirculating circuit for a succeeding cycle.

The chamber 56 of the filter tank has sufficient capacity for a quantity of shortening, to be supplied initially to the recirculating system, and it may be maintained therein in a liquified state by the filter tank heater 60. The recirculating circuit is provided with the liquified shortening or fat stored in the filter tank 55, by means of the pump 35, to pool a quantity of liquified fat in the cooking pot chamber 13. When a predetermined level of liquified fat is left in the filter tank 55, this condition may be signaled by a float switch 67. There is preferably provided, at an elevated point, a heated premelt tank 68 in which makeup shortening is stored, and the bottom of this tank has mounted adjacent thereto suitable heating means, such as an electrically energized heater 69 to maintain this reserve in a liquid state. The chamber 70 of the premelt tank, which may be closed by a removable cover 71, is communicated at its bottom by means of a supply pipe 72 to the section 31 of the recirculating circuit conduit, above the junction point 30, so as to deliver a desired amount of liquified fat from this premelt tank chamber to the section 31 of the recirculating circuit, when needed. Such makeup is effected by the operator between cooking cycles, when the system is recharged for a subsequent cooking cycle after the available quantity of fat has been pumped into the cooking chamber for noting an insufficient quantity therein. For this purpose, a manually operable valve 73 is provided in the supply conduit 72 which may be opened to permit gravity or suction flow therethrough to the closed recirculating circuit. This valve 73 also has check valve means which prevents back up of pressurized hot liquified fat into the premelt chamber 70 during the cooking cycle.

During the pressurized cooking operation steam is developed in the closed cooking pot chamber 13 by vaporization of moisture in the frying chicken parts. Thus, the internal pressure of this closed cooking chamber 13 may gradually increase to beyond a predetermined maximum and should thus be vented. For this purpose, the upper portion of the cooking pot chamber 13 is provided with venting means above the maximum level of the cooking bath that will be pooled therein, for direct connection to the head space. Automatic venting means are provided for this purpose and include a venting pipe 75 which is provided with an operating relief valve 76, which may be of the weighted needle valve type. The discharge 77 of the operating relief valve 76 is connected by a pipe 78 which in turn communicates with a pipe 79 that leads to the interior of a blowdown tank 80. The blowdown tank chamber preferably is provided with an oblique baffle plate 81, as shown in dotted lines in FIG. 2, arranged beyond the discharge communicating end of the venting pipe 79. This chamber, in turn, is communicated to any point of lower pressure, such as atmosphere, by a venting conduit or stack 82. The chamber of the blowdown tank 80 should be provided with means for draining condensate and entrained particles therefrom, such as a drain tube 80a. A valved bypass 83, equipped with a manually operable valve 84, is provided for a purpose indicated later. The venting pipe 75 may be provided with a tube 85 communicated with the interior thereof and leading to a lid pressure switch 86. This tube 85 may also have a branch line 87 which is communicated to a drain pressure switch 88, and an additional tube 89 which communicates a pressure gage 90 thereto.

Provision is also made for blowing down the steam pressure in the head space of the cooking chamber 13 after a cooking cycle is completed. For this purpose a pipe 91 which communicates with the head space of the closed cooking pot chamber 13, in a manner similar to the communication thereinto of the venting pipe 75, is connected to the venting pipe section 83 through an automatic blowdown valve 92. This valve is desirably manipulated between closed and opened conditions by electrically energized operating means 93, and for this purpose may be a solenoid or a motorized valve. An emergency venting passage preferably is provided by connection to the pipe 91 of safety valve 94, which may be similar to the operating valve 76, and set at a slightly higher pressure than the latter. The discharge 95 of the safety valve 94 is connected by a pipe 96 directly to the venting stack 82, thus bypassing the blowdown tank 80. If, for any reason, the blowdown valve 92 does not perform its service emergency venting may be obtained by the manual valve 84.

After the cooking pot lid 12 had been lowered to closure of the cooking chamber 13 and the cooking cycle has started, steam which is developed in the frying of the chicken parts during the cooking cycle is vented through the venting line 75 and venting valve 76 to and through the blowdown tank 80 when the pressure builds up beyond a predetermined maximum. Certain of the steam condenses in the blowdown tank 80 for drainage through the discharge tube 80a and remaining steam and hot air is vented to the exterior by the stack 82. If the pressure in the closed cooking pot chamber 13 exceeds a greater predetermined maximum for any reason, steam is vented from the head space of the cooking pot chamber through the pipe 91 and the safety valve 94 for direct flow into the venting stack 82. This safety relief valve 94 operates only when the operating valve 76 is not operating properly. At the end of the cooking cycle the automatic blowdown valve 92 is opened to allow the steam to pass out through the blowdown tank 80 and the venting stack 82, so as to gradually release the pressure in the cooking chamber head space to a predetermined low maximum at which it is safe to open the drain valve for drainage of the contained hot liquid fat into the filtering tank 55.

Since it is desired to perform the sequence of operations of the units embodied in the recirculating circuit, and the fill and drain services, characteristic of a proper cooking cycle automatically there is provided suitable electrical circuitry and timing mechanism associated therewith and driven thereby which are programmed to provide such sequence, such equipment is diagrammatically illustrated in FIGS. 1 and 2, the box diagram 97 in FIG. 1 labeled "TIMER" being indicative of such electrical circuitry and timing mechanism. Suitable electrical energy is supplied through the supply cable 98. Cable 99 connects this electrical circuitry and timing mechanism to the lid manipulating motor 24. Cable 100 effects a similar connection therefrom to the pump motor 37. Cable 101 provides the connection to the selector valve motor housed at 33. Cable 102 performs a similar function with respect to the drain valve motor housed at 63. Cable 103 energized the filter tank heater 60, and cable 104 performs a like function with respect to the premelt tank heater 69. Cable 105 feeds back a signal from the float switch 67 in the filtering tank chamber 56. Cable 106 feeds back a signal from the flow switch unit 46. Cable 107 (FIGS. 1 and 2) causes timed operation of the automatic blowdown valve 92. The cable 108 supplies energy to the plurality or bank of heaters in the heat exchanger section 50, which may be arranged in subgroups for selective energization for various degrees of heat.

The operation of the pressurized cooking system of the present invention may be best understood by a recital of the sequence of operations to set up the system for a frying cycle and termination thereof for permitting removal of a load of fried chicken from the cooking pot chamber 13, and readying of the system for recycling. With a pump pressure switch which is set for a predetermined maximum, closed, the operator may condition the pump motor 37 for running by closing a "wash" switch, which may be of the pushbutton type, to effect flushing out of residue remaining in the cooking pot and flow circuit. The operator then presses a "fill" switch so as to effect closure of the energizing circuit leading to the pump motor 37, and this automatically effects closure of the blowdown valve 92 and the drain valve 62. At this time the selector valve 32 is in its "closed" condition, i.e., with the pump intake 34 connected through the second inlet port 66 of this valve communicated to the suction withdrawal tube 64. Thus the pump withdraws liquified fat from the filtering tank chamber 56 for delivery to the cooking pot chamber 13 and the recirculating system in which it is embodied when this cooking chamber is closed. With sufficient liquified fat in the filtering tank chamber 56 there is effected a suitable transfer of the liquified fat to the cooking pot chamber 13 until the supply thereof in the filtering tank chamber is reduced to a degree causing closure of the float switch 67. This will cause the driving motor of the selector valve 32 to be energized for manipulating it to its "open" condition, i.e., in which its first inlet port communicates the withdrawal conduit section 27, through the recirculating circuit conduit section 31, to the pump intake 34. At this time the filtering tank chamber 56 is bypassed and it no longer has connection to the recirculating system until it is reconnected thereto for drainage of the cooking pot chamber normally at the end of a cooking cycle.

With the liquified fat being pumped by pump 35 through the section of the recirculating conduit circuit leading to the cooking pot chamber 13 the contacts of a thermostat will be closed to energize all of the heat exchanger heaters 52. When the temperature reaches the predetermined maximum a signal light may indicate that the desired cooking temperature has been reached and the system is ready for a cooking cycle, and thus heat exchanger heaters 52 are deenergized.

If the level of the surface of the bath of hot liquified fat pooled in the cooking chamber 13 is sufficient for the immersed frying of the chicken parts therein the operator loads the racks supporting the latter to beneath the cooking pot lid 12 and lowers this lid to the top of the pot 11, for immersion of the chicken parts into the pooled bath of hot liquified fat and closure of the cooking chamber. This lid lowering operation is effected by closure of a suitable lid-down circuit switch, and as the operator pushes a "lid-down" button power will be supplied through this switch and button to energize the lid lowering and lifting motor 24 for lowering operation thereof. This action also closes a switch in the energizing circuit of the motor which drives the timing mechanism to start the running of the latter.

As the chicken parts are lowered into the pooled bath of hot liquid fat the temperature of the latter drops. Thus the thermostat contacts will make again for energizing all of the heaters 52. This energization of all of the heaters will be maintained for a short period and then some or all of these heaters will be deenergized automatically and in a predetermined sequence to attain a lower heat output condition with resultant desired reduction in temperature of the hot liquid fat. This reduction in temperature takes place during a predetermined time and during the remainder of the cooking cycle the temperature of the circulating hot liquid fat remains above a predetermined minimum. The frying of the chicken parts in the pooled bath continues as the hot liquid fat is recirculated by the running pump through the pooling cooking chamber, and if the temperature thereof drops during this operation below the predetermined minimum a subgroup of the heaters is energized to supply the extra heat required. This is repeated automatically, if necessary, during the remainder of the cooking cycle.

After a period of time approaching the duration of a selected cooking cycle, the energizing circuits of the heaters are opened automatically, and shortly thereafter the pump motor-energizing circuit automatically is opened to stop the pump. As the pump is stopped the energizing circuit of the motor which operates the steam blowdown valve 92 will be closed to cause this valve to open. When the pressure in the closed cooking tank chamber drops by the resulting venting through valve 92 to a selected safe value the drain pressure switch 88 closes to energize the motor which actuates the liquid drain valve 62. The hot liquid fat pooled in the cooking chamber 13 then drains through this valve 62 into the filtering tank inlet compartment 58, and thence into the storage chamber 56 of this tank.

When the pressure in the cooking pot chamber 13 drops further to a predetermined value the lid pressure switch 86 closes, so that the lid-operating motor 24 will be energized for running in the reverse direction to lift the cooking pot lid 12 and its load of fried chicken parts up to its initial position. This permits unloading and removal of the loaded lid rack 21 by the operator. The selector valve 32 is then returned to its "closed" position and the timing mechanism is reset back to zero. This completes a cycle of operation of the pressurized cooking system, which is now readied for a succeeding cycle.

The unique flow switch unit 46, which is preferred for use in an embodiment of the pressurized cooking system of the present invention, is illustrated in FIGS. 4, 5, 6 and 7. All of the parts thereof are either protected or of such a character as not to be subject to deterioration by the liquid flowing therethrough, such as hot liquified fat, or are adequately protected from contact thereby. This flow switch includes a hollow housing of suitable design having a through flow passage, such as in the form of a pipe T-fitting 110. The internally threaded bottom end of the cross bore thereof is adapted to serve as the inlet and, e.g., will be threadably mounted upon the externally threaded end of a pipe section 45 embodied in the recirculating circuit of an embodiment of the pressurized cooking system of the present invention. The outlet from the cross bore of this fitting is provided by the internally threaded side port 111. The switch subassembly and its operating means is threadably mounted in the internally threaded top end of the cross bore of this T-fitting The hollow interior or cross bore of this T-fitting serves as a housing chamber 112.

The switch subassembly and its operating means include a tubular stem or core tube 113 which has an externally threaded upper end 114 that is threaded into an internally threaded hole in a threaded reducing plug 115 which closes the top end 116 of the T-fitting 110. The tubular stem 113 is closed at its bottom end by an integral end wall 117 to provide a closed chamber therein, and both are made of diamagnetic material, such as brass or aluminum. This stem slidably carries thereon a bob 118 which has free axial motion therealong. This bob preferably is in the form of a cylindrical body having a central bore 119 through which the tubular stem 113 is freely received, and the closed bottom end 117 of the latter carries a retaining ring abutment 120 to limit the downward travel of the bob thereon. The body of the bob 118 is also made of diamagnetic material, preferably aluminum because of its relatively lightweight, and it is of a diameter somewhat less than the internal diameter of the fitting chamber 112 to permit free axial movement in the latter. The bob body may be of other lightweight diamagnetic material, such as certain types of molded plastic. It is suitably equipped with a magnetic field source of any suitable form.

Figure 5:
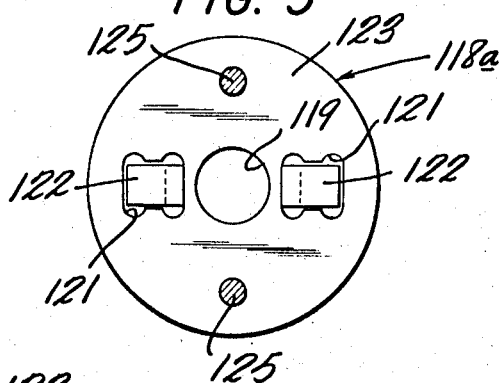
FIG. 5 is an end view, with parts in section, of a portion of a pressure buoyable bob embodied in the flow switch unit of FIG. 4.

By way of example, the mass of the bob body 118 may be reduced by providing in the interior thereof a pair of diametrically opposed cavities 121. Each cavity 121 is provided for reception of suitable magnets, e.g., horseshoe magnets 122 having their north and south poles arranged in lines extending parallel to and spaced apart along the axis of the bob bore 119. These horseshoe magnets 122 are oriented similarly so that the N-poles of both are opposed to each other, with like opposition of their S-poles. Since it is preferred completely to bury in the body of the bob 118 such pair of horseshoe magnets 122 for protective purposes, this bob body is preferably made of two complementary disks 118a and 118b into one or both of the opposed faces 123 and 124 of which are complementary portions of each cavity 121 and, after nesting the magnets 122 therein, these disks are secured together in any suitable manner such as by any suitable connecting screws 125 (FIG. 5). A loose slidable stop sleeve 126 is carried by the tube 113 above the bob 118, so as to limit the rise of the latter when the pressure of liquid is applied to the bottom of the latter through the inlet or bottom end 127 of the bore chamber 112. This pressurized liquid (such as hot liquified fat for the present service) will also flow up any annular space intervening the circumferential surface of the bob 118 and the wall of chamber 112 to apply additional lift to the bob so as to raise the latter to an uppermost position determined by stop sleeve 126, where the bob is maintained during the flow of the pressurized liquid up through the chamber past the bob and out through the side port 111. If this flow of liquid ceases or the rate thereof decreases to below a minimum which will maintain the bob 118 buoyed to its uppermost position the latter will slide down to its initial lowermost position. The stop sleeve 126 is of a length to assure that in the uppermost positions of the bob 118 the permanent magnets 122 carried therein are so located relative to the electrical circuit switch that is embodied in this assembly as to effect and maintain closure of the latter when the bob is raised to and held in this elevated position.

Figure 4:
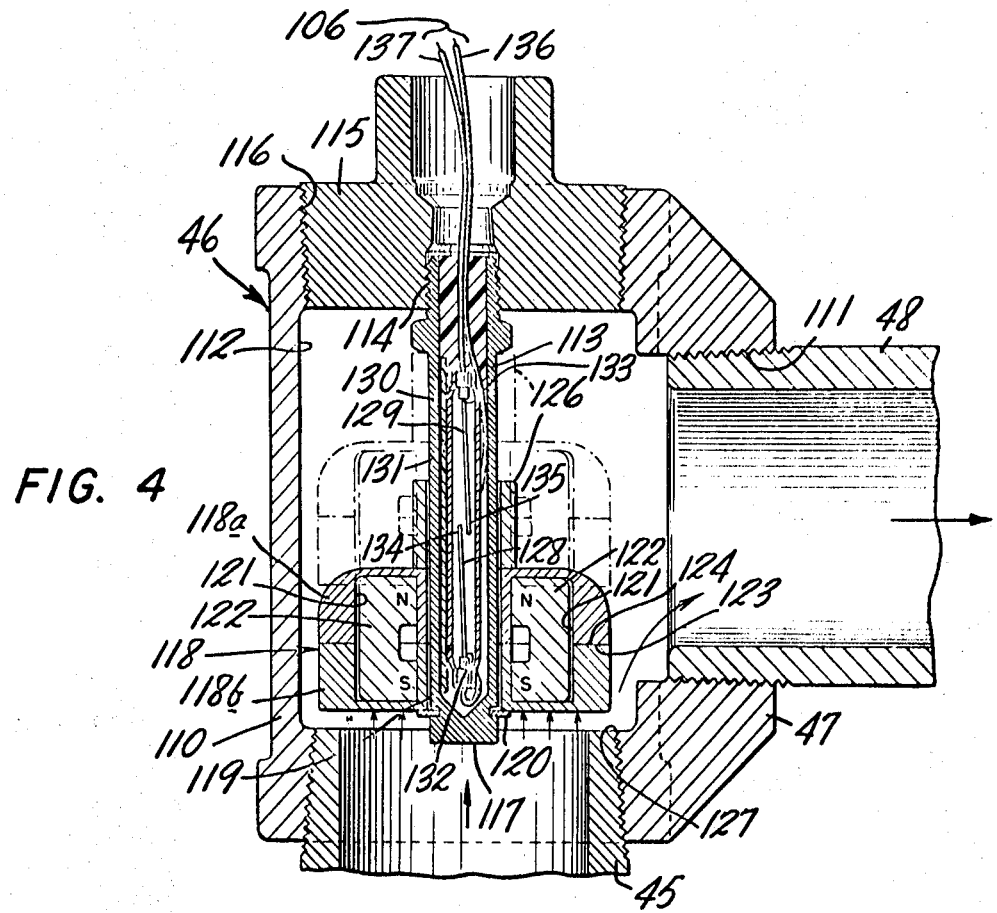
FIG. 4 is an axial section, with parts broken away of the unique flow switch unit which is preferably embodied in the liquid recirculating system of FIG. 1.

As will be seen in FIG. 4, the electrical circuit switch embodied in the flow switch unit 46 is in the form of a pair of swingable contact strips 128 and 129, which may be flexible reeds, and are mounted in and supported at opposite ends of a sealed envelope or capsule 130, that may be of glass or other suitable material. This envelope 130 is preferably supported, such as by suitable adhesive or binding tape, upon a strip 131 of insulative material, such as plastic, that is fixed at one end within the top end 114 of the core tube 113. The reeds 128 and 129 respectively have outer ends 132 and 133 supported by and mounted in terminal seals at opposite ends of the envelope 130. A a consequence, the opposed free ends 134 and 135 of the reeds 128 and 129 extend toward each other and overlap. These free ends are bent away from each other to provide an intervening gap for open switch condition, as will be seen in FIGS. 4 and 6. Circuit connecting wires 136 and 137 are connected electrically to the seal terminals in which the fixed ends 132 and 133 of the reeds 128 and 129 are supported, with these wires extending out through the fitting section 114 of the core tube 113 for connection into an electrical control circuit of the heat exchanger circuitry. Preferably, the reeds 128 and 129 are of material which has a permeability greater than unity and is electrically conductive, so that they may be flexed by the magnetic fields of the opposed permanent magnets 122 and to serve as contacts of the circuit switch. These reeds may be of any suitable material, such as iron, etc., having these required characteristics, but, while being paramagnetic, should not be retentive of a magnetic field.

Figure 6:
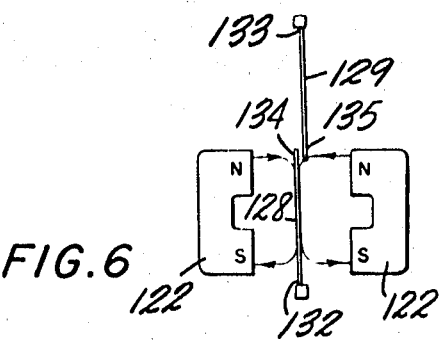
FIG. 6 is a somewhat diagrammatic view of the switch contacts embodied in the FIG. 4 device and associated switch-operating permanent magnets, illustrating the switch open position.

It will be seen from FIG. 6 that in a lower position of the bob 118 the free ends 134 and 135 of the lower and upper contact reeds 128 and 129 are in the near vicinity of the N-poles of the permanent magnets 122, and thus they are repelled from each other to assure a switch-open condition. In this switch-open position of the bob 118 the lines of force emanating from the N-poles of the permanent magnets 122 extend to the reed 128 and down therealong to branch across to the S-poles thereof. In the raised, switch-closing position of the bob 118, illustrated in FIG. 7, these lines of force impose opposite polarity upon the tip ends 134 and 135 of the eeds 128 and 129, so that these lapping tip ends are caused to be brought to contact with each other, to close the switch. Thus, only when the bob 118 is buoyed to the uppermost position will the switch be closed, and when the flow is insufficient to raise the bob to this position this flow switch will be open.

It is to be understood that in the flow switch unit the spacing of the circumferential surface of the diamagnetic bob 118 from the inner surface of the chamber cross bore 112 may be minimal so that the amount of flow of pressurized liquid therebetween in comparison to the total volumetric flow up through this flow switch unit, is relatively small. However, it may be desirable that there be appreciable flow up between the wall of the bob bore 119 and guide tube 113, as well as between the wall of chamber 112 and the exterior of the bob 118, for a washing effect in situations where there is a tendency to build up deposits on such opposed surfaces. The pressure applied by the liquid to the bottom end of the bob will cause it to be raised toward its topmost switch-closed position, and before this position is attained flow upward from the inlet 127 will be communicated directly to the outlet port 111 past the near side of the bob. Thus lift is applied to the bob both by the pressure imposed upon its bottom end and the action of the current of liquid flowing past one portion of the bottom edge and the adjacent side portion to complete the raising of the bob to its topmost position almost immediately, particularly when the elevated pressure of the pressurized liquid and its rate of flow are relatively high.

It is also to be understood that it is not necessary to the circuit closing action of the switch contact reeds of the flow switch unit 46 that they both be made of material that is paramagnetic as well as electrically conductive. For example, the uppermost reed 129 alone may be of such material or be merely electrically conductive and carry an elongated body of paramagnetic material to cause its free end to flex or swing toward the opposed free end of lowermost reed 128, or any relatively fixed switch contact serving the purpose of the latter. In such event it would be necessary to employ in the bob only a single permanent magnet located to the far side of contact reed 129 to cause it to swing toward the opposed contact in the topmost position of the bob. In the latter event suitable key means may be employed between the core tube 113 and the bore 119 of the bob which would maintain therebetween the proper relative angular orientation while allowing free axial slide of the bob along the tube.

Further, one of the bob disks 118a and 118b may have the major portions of the magnet-receiving cavities 121 provided therein with the other disk merely being a cover plate to close these cavities.

It will thus be seen that the flow switch unit 46 is a flow responsive electrical switch mechanism which includes casing means providing an elongated upright chamber having axially spaced inlet and outlet ports at different elevations for prolonged flow of liquid upward therethrough between the latter. Guide means are provided in this chamber which extends in the upward axial direction, and a pressure buoyable bob is mounted in the chamber for up and down free motion between a lowermost position and an uppermost position with engagement of the guide means for guidance in such motion. The bob carries magnetic means which provides a localized field of magnetic lines of force. An electrical circuit switch is associated with this bob and has a pair of cooperative and normally separated make and break contacts with at least one thereof being movably mounted relative to the other and carrying or embodying paramagnetic material adapted to be within the influence of the magnetic field when this movable contact is in the vicinity of this field at the uppermost position of the bob. As a result this magnetic field in the uppermost position of the bob moves this carrier contact to engagement of the other contact for switch closure. These switch contacts are automatically separable for switch opening when the carrier contact is remote from the magnetic field at the lowermost position of the bob. This bob is buoyable to its uppermost position by upward flow of the liquid from the inlet port to the outlet port at a rate above a predetermined minimum and is capable of descending to its lowermost position when the liquid flow rate drops below this minimum rate.

Figure 7:
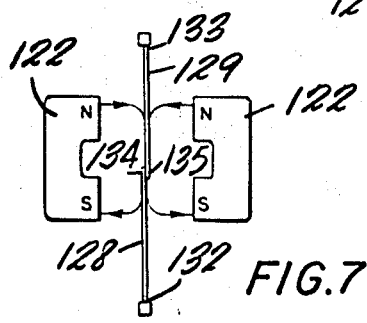
FIG. 7 is a view similar to FIG. 6 illustrating translation of the magnets to a position which effects closure of the switch contacts.

Only one of the pair of permanent magnets 122 necessarily is carried by the bob 118, to attain the switch open and closing action illustrated in FIGS. 6 and 7. The pair of permanent magnets 122 is preferred only because it increases the strength of the magnetic force fields and for mass balance of this bob 118. If it is desired to use only one of the magnets 122 in one of the cavities 121 of the bob 118 mass balance of this bob may be attained by locating in the other cavity 121 a mass of diamagnetic material of a weight substantially equal to that of the single magnet 122. It is also possible to provide the magnet structure in the form of a sleeve having top and bottom differing poles. For example, such a sleeve may be made of ceramic material which will resist high temperatures and it may have distributed therethrough suitable magnetic material or it may encompass a sleeve of the latter material with, for example, the top end of this assembly constituting an N-pole and the bottom thereof constituting an S-pole.

The unique flow switch 46, in a form embodying the features illustrated in FIGS. 4 to 7 inclusive, is particularly useful in systems through which flows fluids maintained at relatively high temperatures. The various diamagnetic parts may be formed from a variety of types of available materials which are now commonly known or may be developed that will withstand the prevailing temperatures of the services for which such flow switch are intended. The only limiting factor, temperaturewise, should be that of the magnetic field source.

Having described our invention, what we claim as new and desire to secure by Letters Patent is the novel subjects matter defined in the following claims.

1. A pressurized cooking system for frying food, such as chicken parts, in hot medium which comprises a closable and sealable cooking pot defining an isolated chamber for removable reception of the food to be fried in a bath of hot liquified fat therein, a pump having an intake and a discharge, closed through-flow liquid fat cleansing means, and heat exchanger means having inlet and outlet means; characterized in the provision of means closing off the interior of said heat exchanger means for through-flow of liquid fat from the inlet to the outlet means thereof under elevated pressure and in isolation from the surrounding atmosphere, and isolating conduit means connecting said cooking pot chamber in closed condition, said pump, said cleansing means and said heat exchanger means in series in a closed hot liquid fat-recirculating circuit with communication of a liquid fat withdrawal section of said conduit means to said closed chamber being located below the intended elevation of the surface of hot liquid fat that is pooled therein while continuously flowing therethrough during a cooking cycle, said liquid fat-recirculating circuit maintaining under elevated pressure and in isolation from the surrounding atmosphere hot liquid fat which is continuously pumped therethrough by said pump during a cooking cycle with maintenance in the top of said chamber above the hot liquid fat surface of a substantially liquid-free head space.

2. The pressurized cooking system of claim 1 characterized by the provision of venting conduit means connected directly to the head space of said closed cooking chamber and leading to a lower pressure venting point, and a normally closed operating valve means in said venting conduit means adapted to open at a predetermined maximum pressure automatically to vent steam from said head space during the cooking cycle when the pressure in the latter exceeds such maximum.

3. The pressurized cooking system of claim 2 characterized by the provision of a blowdown venting means connected directly to said cooking chamber head space for venting to a point of lower pressure the steam pressure in the latter, and normally closed steam blowdown valve means embodied in said venting means for opening said venting means after completion of a cooking cycle.

4. The pressurized cooking system of claim 1 characterized by a heated filtering and drain tank defining a hot liquid fat receptive chamber, means defining an inlet passage to said drain tank chamber equipped with an openable normally closed drain valve and connected through the latter directly to said liquid fat withdrawal section of said recirculating conduit means which communicates with said cooking pot chamber, a two-way selector valve mounted in said recirculating conduit means with its outlet port connected to said pump intake and one of its pair of inlet ports connected to said conduit means withdrawal section beyond connection thereto of said drain tank inlet passage, and means defining a suction withdrawal passage connecting the other inlet port of said selector valve to the bottom of said drain tank chamber.

5. The pressurized cooking system of claim 4 characterized by filtering means mounted in said filtering and drain tank chamber intervening its inlet passage and suction withdrawal passage.

6. The pressurized cooking system of claim 4 characterized by a heated premelt tank defining a chamber for melting solid fat and holding it for demand, means defining a supply passage leading from the bottom of said premelt chamber to connection with said liquid fat withdrawal section of said recirculating conduit means for supply of liquid fat to said recirculating conduit means from said premelt chamber, check valve means in said premelt supply passage preventing backflow of pressurized recirculating hot liquid fat into said premelt chamber, and off-on valve means in said premelt supply passage to permit flow of liquified fat from said premelt chamber into said recirculating conduit circuit.

7. The pressurized cooking system of claim 6 characterized by means supporting said heated premelt tank at an elevation above the point of connection of said premelt tank supply passage to said recirculating conduit means for gravity flow or suction of hot liquid fat into the latter from said premelt chamber when said drain valve is closed and said pump is running while said system is not pressurized.

8. The pressurized cooking system of claim 1 characterized by said closed through-flow liquified fat cleansing means being in the form of a cyclone filter having a through-flow passage and rejects discharge in which particles of solids entrained in the pressurized hot liquified fat flowing therethrough are separated there out of as rejects and these rejects are delivered through the discharge.

9. The pressurized cooking system of claim 8 characterized by means connecting the through-flow passage of said cyclone filter into said recirculating conduit means at a location intervening the discharge of said pump and the inlet of said heat exchanger means.

10. The pressurized cooking system of claim 1 characterized by means defining in said heat exchanger a through-flow passage extending between its inlet and outlet means for flow of pressurized hot liquid fat therethrough and the provision of the heat source in said heat exchanger in the form of electrically energized heating means mounted in said through-flow passage for immersion in the flowing fat, electrical circuit means for energizing said heating means; and a flow switch unit mounted in said recirculating conduit means with said switch unit and said heat exchanger intervening said pump and said cooking pot chamber, said flow switch unit having a through-flow passage, an electrical circuit switch mounted in said electrical heating energizing circuit means, and a control for said circuit switch mounted in said flow switch passage responsive to the rate of flow of hot liquid fat through the latter whereby when such flow rate is below a predetermined minimum said circuit switch is open and when above such minimum said circuit switch is closed.

11. The pressurized cooking system of claim 10 characterized by electrical means to drive said pump, a movable lid for said cooking pot chamber, electrical motorized means alternately for moving said lid to closing position of said cooking pot chamber and removing said lid, a steam blowdown venting means connected directly to said cooking pot chamber head space for venting to a point of lower pressure the steam pressure in the latter after completion of a cooking cycle including an electrically operated valve for opening said steam venting means after completion of a cooking cycle, a heated drain tank defining a hot liquid fat receptive chamber, means defining an inlet passage to said drain tank chamber equipped with a normally closed liquid drain valve connected through the latter directly to said liquid fat withdrawal section of said recirculating conduit means and electrically energized means to open said drain valve after completion of a cooking cycle, an electrically operated two-way selector valve mounted in said recirculating conduit means with its outlet port connected to said pump intake and one of its pair of inlet ports connected to said conduit means withdrawal section beyond connection thereto of said drain tank inlet and the other of its inlet ports communicated with the bottom of said drain tank chamber; and electrical energizing control circuit means including timing mechanism connected to said electrical pump driving means, said electrical motorized lid moving means, said electrical circuit means for energizing said heating means which includes said flow switch, said steam-venting blowdown valve, said liquid drain valve and said selector valve, whereby said units may be operated in timed relation after loading of chicken parts into said cooking chamber to close the latter by said lid, said drain valve may be closed, said pump may be started and run to transfer hot liquid fat from said drain tank into said recirculating conduit means for delivery successively through said flow switch and said heat exchanger to said closed cooking pot chamber, said selector valve may be operated to close the suction withdrawal passage of said drain tank chamber with simultaneous connection through the selector valve of the pump intake to the cooking pot chamber withdrawal conduit section for recirculating the hot liquid fat through said cooking pot chamber, said heat exchanger heating means may be selectively energized for maintaining desired degrees of elevated temperature of the hot liquid fat recirculated through the cooking pot chamber during a predetermined frying period, and then said heat exchanger heating means may be deenergized, said pump stopped, said steam blowdown valve may be opened, said drain valve may be opened to transfer the hot liquid fat in said cooking chamber to said drain chamber, said cooking pot lid removed to allow removal of the fried chicken parts and said selector valve returned to its initial setting for a recycling operation.

12. The pressurized cooking system of claim 1 characterized by the provision of a lowerable and liftable lid to close said cooking pot chamber, support means mounted on said lid detachably to support in depending position therefrom a rack structure for carrying chicken parts, and a unitary rack structure having means detachably to engage said support means for removable engagement of said support means.

13. The pressurized cooking system of claim 12 characterized by said support means being in the form of transversely spaced anchors mounted to the underside of said lid, said rack structure having its top portion provided with suspending means detachably to engage said anchors to permit ready mounting of said rack structure to the underside of said lid and removal therefrom.

14. The pressurized cooking system of claim 13 characterized by said anchors being in the form of a pair of depending flanges each carrying a plurality of rollers having their axes extending laterally, said suspending means being in the form of a pair of transversely spaced and laterally extending overhanging members adapted slidably to be received over said rollers for such detachable support of said unitary rack structure.

15. A pressurized cooking system for frying foods, such as chicken parts, in hot cooking liquified fat which embodies a closed recirculating system for the hot-cooking liquid that maintains it during a cooking cycle at elevated pressure and in isolation from the surrounding atmosphere, said closed isolating system comprising a closable and pressuretight sealable cooking pot defining an isolated chamber for reception of the food to be fried at elevated pressure in a bath of the hot cooking liquid in said pot chamber, a pump having an isolated through-flow path, a heat exchanger having means closing off its interior from the surrounding atmosphere while providing therethrough an isolated through-flow path, and isolating flow-conducting means interconnecting said pot chamber and the flow paths through said heat exchanger and pump, said pump effecting recirculation of the hot-cooking liquid through this system at elevated pressure during a cooking cycle with continued isolation of the recirculating cooking liquid from the surrounding atmosphere and maintenance in the top of said pot chamber above the circulating hot cooking liquid pooled therein of a substantially liquid-free head space, connection of the withdrawal section of said system to said pot chamber being effected by means communicating it to the latter below the intended elevation of the surface of the circulating hot cooking liquid that is pooled in said chamber during the cooking cycle.

PO-1050
(5/69)

UNITED STATES PATENT OFFICE
CERTIFICATE OF CORRECTION

Patent No. 3,608,472      Dated September 28, 1971

Inventor(s) Arthur F. Pelster, William L. Parker and Donald D. Modglin

It is certified that error appears in the above-identified patent and that said Letters Patent are hereby corrected as shown below:

Page 1 with "Abstract" column 2, line 25, for "nd" read --and--; column 1, line 71, strike out "mechanisms"; column 2, line 31, for "Vented" read --Venting--; line 39, for "communicates" read --chamber--; line 41, for "inlet opening" read --the--; lines 50-51, for "inlet opening" read --a--; column 3, line 4, for "oxidation" read --oxidative--; line 56, after "tank" insert a comma (,); column 4, line 56, strike out the hyphen "-"; line 70, strike out the hyphen "-"; line 71, for "provide" read --provided--; column 5, line 41, after "be" insert --a--; line 46, after "through" insert --a--; column 6, line 10, after "13," read --13.--; column 6, line 40, for "by" read --of--; column 7, line 55, after "of" insert --a--; line 70, for "82," read --82.--; column 8, line 26, for "energized" read --energizes--; column 10, line 5, after "T-fitting" insert a period (.); column 11, line 3, for "A a" read --As a--; line 31, for "eeds" read --reeds--; and column 12, line 61, for "switch" read --switches--.

Signed and sealed this 18th day of April 1972.

(SEAL)
Attest:

EDWARD M. FLETCHER, JR.
Attesting Officer

ROBERT GOTTSCHALK
Commissioner of Patents